United States Patent
Ohms et al.

(10) Patent No.: US 11,496,302 B2
(45) Date of Patent: Nov. 8, 2022

(54) SECURELY PROCESSING SECRET VALUES IN APPLICATION CONFIGURATIONS

(71) Applicant: INTERNATIONAL BUSINESS MACHINES CORPORATION, Armonk, NY (US)

(72) Inventors: Konrad Ohms, Boeblingen (DE); Diane Kim, Durham, NC (US); Amardeep S. Kalsi, Worcester Park (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 633 days.

(21) Appl. No.: 16/502,846

(22) Filed: Jul. 3, 2019

(65) Prior Publication Data
US 2021/0006402 A1 Jan. 7, 2021

(51) Int. Cl.
*H04L 29/06* (2006.01)
*H04L 9/08* (2006.01)
*G06F 16/13* (2019.01)

(52) U.S. Cl.
CPC .......... *H04L 9/0894* (2013.01); *G06F 16/137* (2019.01); *H04L 9/0825* (2013.01)

(58) Field of Classification Search
CPC .... H04L 9/0894; H04L 9/0825; G06F 16/137
USPC ....................................................... 713/165
See application file for complete search history.

(56) References Cited

U.S. PATENT DOCUMENTS

| | | | | |
|---|---|---|---|---|
| 9,792,103 | B2* | 10/2017 | Govindaraju | G06F 3/0482 |
| 10,102,107 | B2* | 10/2018 | Darbha | G06F 11/3624 |
| 10,404,833 | B1* | 9/2019 | de Sales, Jr. | H04L 67/34 |
| 11,184,157 | B1* | 11/2021 | Gueron | H04L 9/083 |
| 2002/0194484 | A1* | 12/2002 | Bolosky | H04L 9/3247 713/189 |
| 2016/0191494 | A1* | 6/2016 | Claes | H04L 63/0853 713/159 |
| 2016/0246583 | A1* | 8/2016 | Kolesnik | G06F 8/63 |
| 2017/0249128 | A1* | 8/2017 | Fojtik | G06F 8/71 |

(Continued)

OTHER PUBLICATIONS

M. E. S. Elrabaa; Secure Computing Enclaves Using FPGAs; IEEE:2019; pp. 593-604.*

(Continued)

*Primary Examiner* — Monjur Rahim
(74) *Attorney, Agent, or Firm* — Konrad Raynes Davda & Victor LLP; Janaki K. Davda

(57) ABSTRACT

Provided are techniques for securely processing secret values in application configurations. A configuration file for an application is retrieved from a first repository, where the configuration file stores a configuration value and a link to a secret value in a second repository. The secret value is retrieved from the second repository using the link. The configuration value is hashed to output a hashed configuration value and the secret value is hashed to output a hashed secret value. The hashed configuration value is signed, with a private key, to output a hashed and signed configuration value, and the hashed secret value is signed, with the private key, to output a hashed and signed secret value. The configuration value, the secret value, the hashed and signed configuration value, and the hashed and signed secret value are stored in a release file. The application is executed using the release file.

20 Claims, 15 Drawing Sheets

(56) References Cited

U.S. PATENT DOCUMENTS

| | | | | |
|---|---|---|---|---|
| 2018/0167210 | A1* | 6/2018 | Brands | H04L 9/0869 |
| 2018/0275881 | A1* | 9/2018 | Ashraf | G06F 3/065 |
| 2018/0316685 | A1* | 11/2018 | Eberlein | G06F 9/451 |
| 2019/0095186 | A1* | 3/2019 | Jozsa | G06F 8/65 |
| 2019/0253264 | A1* | 8/2019 | Singaravelu | H04L 9/0877 |
| 2019/0272162 | A1* | 9/2019 | Couillard | H04L 9/088 |
| 2020/0382297 | A1* | 12/2020 | Basile | G06F 16/2246 |
| 2021/0117555 | A1* | 4/2021 | Bernat | H04L 9/0891 |
| 2021/0209224 | A1* | 7/2021 | Bursell | G06F 21/53 |

OTHER PUBLICATIONS

Hashicorp, "Vault", [online], [Retrieved on Apr. 26, 2019], Retrieved from the Internet at <URL: https://vaultproject.io/>, 3 pp.

IBM Corporation, "General CLI (ibmcloud) Commands", [online], Last Updated May 21, 2019, [Retrieved on Jun. 2, 2019], Retrieved from the Internet at <URL: https://cloud.ibm.com/cli?topic=Cloud cli-ibmcloud_Cli . . . >, 3 pp.

Mell, P., et al., "Effectively and Securely Using the Cloud Computing Paradigm", NIST, Oct. 7, 2009, 80 pp.

Well, P., et al., "The NIST Definition of Cloud Computing", NIST, Special Publication 800-145, Sep. 2011, 7 pp.

Suse, "Containers as a Service (CaaS)", Definition, [online], [Retrieved on Jun. 4, 2019], Retrieved from the Internet at <URL: https://whatis.suse.com/definition/containers-service-caas/>, 2 pp.

Wiggins, A., "The Twelve-Factor App", Introduction, [online]. Last Updated 2017, [Retrieved on Apr. 26, 2019], Retrieved from the Internet at <URL: https://12factor.net>, 3 pp.

Wiggins, A., "The Twelve-Factor App", III. Config, [online], Last Updated 2017, [Retrieved on Apr. 26, 2019], Retrieved from the Internet at <URL: https://12factor.net/Config>, 2 pp.

Wikipedia, "Digital Signature", [online], Last Edited May 26, 2019, [Retrieved on May 27, 2019], Retrieved from the Internet at <URL: https://en.wikipedia.org/wiki/Digital_signature>, 13 pp.

Wikipedia, "Function as a Service", [online]. Last Edited May 3, 2019, [Retrieved on Jun. 2, 2019], Retrieved from the Internet at <URL: https://en.wikipedia.org/wiki/Function_as_a_service>, 2 pp.

Wikipedia, "X.509", [online], Last Edited May 14, 2019, [Retrieved on Jun. 2, 2019], Retrieved from the Internet at <URL: https://en.wikipedia.org/wiki/X.509>, 15 pp.

* cited by examiner

```
On a build server, a one time setup is performed by the secret resolution tool with:

$ openssl req -nodes -x509 -sha256 -newkey rsa:4096 -keyout "private.key" -out
"public.crt" -days 365 -subj "/C=DE/ST=Baden Wuertemberg/L=Boeblingen/O=IBM/
OU=Cloud/CN=build-server1"

Generating a 4096 bit RSA new private key
..............................++
............++
and writing the new private key to 'private.key'
-----

Afterwards, there are two files available:
private.key  - This is considered to be secret and does not leave the build server.
public.crt   - This public certificate may be distributed and is present at the application in
the end to verify the signature.
```

The secret resolution tool on the build server takes the secret value of DB_PASSWORD, "abc" in this example, which has been loaded from the secret repository.
The secret resolution tool calculates a hash checksum (with sha256 in this example), which uniquely identifies the string value "abc".

Example:
$ echo -n "abc" | openssl dgst -sha256
(stdin)= ba7816bf8f01cfea414140de5dae2223b00361a396177a9cb410ff61f20015ad The sha256 hash of "abc" is "ba7816bf8f01cfea414140de5dae2223b00361a396177a9cb410ff61f20015ad", and the string has a fixed length.

The secret resolution tool may calculate the checksum and sign the checksum with the private key in one command. Outputs may be written to files in this example (or stored in main memory in other examples).

$ echo "abc">pw.txt
$ openssl dgst -sha256 -sign "private.key" -out signed-pw.sha256 pw.txt Afterwards, pw.txt contains the plain password "abc", and the signed-pw.sha256 contains the signed (encrypted) sha256 hash of the string "abc".

The -A option is added to not include line breaks.

$ openssl base64 -in signed-pw.sha256 -A
vOakrEPbh4yWFFydjGpkpsheN7/
thm9sUEaEYG5e9+rNKJgJZpWBFytGPKHEgupErt0SSwrRMYkzamVurLbehVR8lwH8
OvY+WoJ0ev51hEhXR84VaocS4bfLH3A9aWiCya67Jqs1L11+myUok53HV2e+XN8jnh
bbtcgrAVKnhpI3A9ZEi6o8tj1owu/
ouyF0Vk90j0El6CQ5TXrisRReyscEB9xRiyj2ZzIetsMQmeAPZBk2mPz4YNi2TPhNwsF
vUtIw6zS0041rzopGm7ogz8dkN+6i2Wr31ojLnbo6POkQLKFPzEN6lqMcYbjHMh0MG
e6mWRlGB16XlCwarJuGFCN6k97kKp1krHdS8pJ6/mee/
wDMibb1hBy0MTGz+rBB9td0EJv8IpVgnDTMIFKmhMVqeN0oz2gBZnVqwT5pAgsC
5OS9ZL1n7ZRaSu283lYEcZMdLONlAgjE0Cg3Ip80wo/
2xZ7SPGgTahseF4JsQ0gI5xtPHCfAtysC9nZqtCs/ZKsQu6AU1/
CMD+W+RF19VAjy06ZGilrinHDnApLUTchNN0URARhsV/
yjiv8THBMTGQ+nVOyROLETTAHNDVsNUI4z4L0Z1+4qTFmm7XcD6MAaZSPGIS1
dHYwzwXpoC0zrOUmyQRVSXrruv3AFJmqnSRB/gdvYCbjTgUhBllr5KFI=

That encrypted, base64 encoded form of the hash is now also written to the release.env
file. In the end the file contains both entries:
DB_PASSWORD="abc"
DB_PASSWORD_SIGNED="vOakrEPbh4yWFFydjGpkpsheN7/
thm9sUEaEYG5e9+rNKJgJZpWBFytGPKHEgupErt0SSwrRMYkzamVurLbehVR8lwH8
OvY+WoJ0ev51hEhXR84VaocS4bfLH3A9aWiCya67Jqs1L11+myUok53HV2e+XN8jnh
bbtcgrAVKnhpI3A9ZEi6o8tj1owu/
ouyF0Vk90j0El6CQ5TXrisRReyscEB9xRiyj2ZzIetsMQmeAPZBk2mPz4YNi2TPhNwsF
vUtIw6zS0041rzopGm7ogz8dkN+6i2Wr31ojLnbo6POkQLKFPzEN6lqMcYbjHMh0MG
e6mWRlGB16XlCwarJuGFCN6k97kKp1krHdS8pJ6/mee/
wDMibb1hBy0MTGz+rBB9td0EJv8IpVgnDTMIFKmhMVqeN0oz2gBZnVqwT5pAgsC
5OS9ZL1n7ZRaSu283lYEcZMdLONlAgjE0Cg3Ip80wo/
2xZ7SPGgTahseF4JsQ0gI5xtPHCfAtysC9nZqtCs/ZKsQu6AU1/
CMD+W+RF19VAjy06ZGilrinHDnApLUTchNN0URARhsV/
yjiv8THBMTGQ+nVOyROLETTAHNDVsNUI4z4L0Z1+4qTFmm7XcD6MAaZSPGIS1
dHYwzwXpoC0zrOUmyQRVSXrruv3AFJmqnSRB/gdvYCbjTgUhBllr5KFI="

The application gets two values as environment variables:

DB_PASSWORD="abc"
DB_PASSWORD_SIGNED="vOakrEPbh4yWFFydjGpkpsheN7/
thm9sUEaEYG5e9+rNKJgJZpWBFytGPKHEgupErt0SSwrRMYkzamVurLbehVR8lwH8
OvY+WoJ0ev51hEhXR84VaocS4bfLH3A9aWiCya67Jqs1L11+myUok53HV2e+XN8jnh
bbtcgrAVKnhpI3A9ZEi6o8tj1owu/
ouyF0Vk90j0El6CQ5TXrisRReyscEB9xRiyj2ZzIetsMQmeAPZBk2mPz4YNi2TPhNwsF
vUtIw6zS0041rzopGm7ogz8dkN+6i2Wr31ojLnbo6POkQLKFPzEN6lqMcYbjHMh0MG
e6mWRlGB16XlCwarJuGFCN6k97kKp1krHdS8pJ6/mee/
wDMibb1hBy0MTGz+rBB9td0EJv8IpVgnDTMIFKmhMVqeN0oz2gBZnVqwT5pAgsC
5OS9ZL1n7ZRaSu283lYEcZMdLONlAgjE0Cg3Ip80wo/
2xZ7SPGgTahseF4JsQ0gI5xtPHCfAtysC9nZqtCs/ZKsQu6AU1/
CMD+W+RF19VAjy06ZGilrinHDnApLUTchNN0URARhsV/
yjiv8THBMTGQ+nVOyROLETTAHNDVsNUI4z4L0Z1+4qTFmm7XcD6MAaZSPGIS1
dHYwzwXpoC0zrOUmyQRVSXrruv3AFJmqnSRB/gdvYCbjTgUhBllr5KFI="

The application is now able to decrypt DB_PASSWORD_SIGNED with the public key of the build server, compute a hash based on the plain password, and compare the results.

Example:

decoding base64 string and write bytes back to file for convenience
$ echo "${DB_PASSWORD}">pw.txt
$ echo "${DB_PASSWORD_SIGNED}" | openssl base64 -d -out signed-pw.sha256

Afterwards, the following files are available to the application:
public.crt        - public certificate, which was distributed to the application, e.g. via a key server or as source code file during the deployment
pw.txt            - plain text password
signed-pw.sha256  - decoded sha256 hash signature of the plain text password Validation:
As a public certificate has been generated, it contains more information than just the public key.
$ openssl x509 -in "public.crt" -text -noout
Certificate:
  Data:
    Version: 3 (0x2)
    Serial Number:
      c0:9c:a5:d6:27:66:5e:6f
  Signature Algorithm: sha256WithRSAEncryption
    Issuer: C=DE, ST=Baden Wuertemberg, L=Boeblingen, O=IBM, OU=Cloud, CN=build-server1
    Validity
      Not Before: May 27 12:51:23 2019 GMT
      Not After : May 26 12:51:23 2020 GMT
    Subject: C=DE, ST=Baden Wuertemberg, L=Boeblingen, O=IBM, OU=Cloud,

CN=build-server1
    Subject Public Key Info:
        Public Key Algorithm: rsaEncryption
        Public-Key: (4096 bit)
        Modulus:
            00:c0:09:90:eb:9e:96:51:2b:5c:65:59:d9:94:cd:
            e0:7a:8e:4d:53:12:c4:5b:ed:93:76:2a:6f:07:b8:
            c0:70:e0:c4:36:58:be:d1:69:af:94:b6:de:61:d3:
            2d:72:25:8f:7d:a8:16:e6:42:6c:e2:d2:6a:99:02:
            22:e2:e2:85:22:cf:32:8c:73:a0:c0:f7:a6:b3:c9:
            d1:e7:b1:ff:9c:e2:7c:e4:57:b6:21:dc:34:d1:5d:
            a2:6d:0d:b6:18:42:7a:66:61:6f:d1:71:d4:27:a9:
            c6:93:37:9c:13:87:eb:51:ec:02:25:c4:8a:fb:c6:
            1a:dc:83:73:81:9e:d4:1c:51:7d:a8:e6:82:20:fd:
            20:55:ac:b4:92:39:93:9a:d9:11:60:96:52:b4:36:
            77:f2:7f:72:db:3c:a2:55:fd:b1:c4:3e:8d:40:8a:
            c1:dc:10:e8:18:a0:8f:1c:ab:68:dc:be:68:8a:89:
            30:17:61:f0:52:3f:f9:3a:f2:d7:78:59:25:17:c1:
            b0:55:59:0a:8f:59:ac:dc:52:80:67:6c:ae:c1:dd:
            24:55:54:46:fa:64:8d:8a:77:d3:4b:22:13:0d:97:
            2f:d6:2f:94:3f:96:3c:85:76:18:6b:1a:9f:e8:6f:
            c3:a0:76:9e:91:ee:8a:d2:b5:e0:80:17:47:f1:1a:
            2b:83:19:77:f5:b4:04:10:c5:ee:bb:44:b8:85:6d:
            07:00:55:01:1a:74:a1:8e:bf:c1:34:51:d9:db:c9:
            26:2d:11:4f:6e:33:62:19:ca:ce:37:33:1d:4a:c4:
            44:68:93:dc:6a:c7:04:29:87:fd:0f:86:e1:52:7c:
            c3:e6:15:b5:1b:76:1c:d5:2b:1b:fa:d7:26:d0:4f:
            9c:ab:3d:6c:e6:29:cd:ef:4e:9d:83:fd:58:0d:6b:
            2c:e7:7b:e5:3e:06:2a:01:c3:e8:ce:c7:61:a8:3d:
            17:7a:90:b8:bf:7f:7b:b4:4d:7c:69:db:8a:85:65:
            05:4b:4b:51:6f:42:da:6a:38:8c:9b:3b:24:7d:f2:
            08:7f:b1:af:4d:d0:8f:13:75:f4:75:39:3c:df:0d:
            55:40:80:d2:06:41:17:3c:03:99:95:95:c4:ca:e7:
            2c:83:a0:13:87:2a:ee:c2:59:df:56:79:8d:3c:87:
            d9:27:a0:03:eb:23:49:11:00:8b:a8:f7:32:98:03:
            4f:a7:bd:95:0f:73:b7:6a:17:99:7e:8e:d9:9b:84:
            9b:67:19:e6:39:d4:e8:a4:ff:91:03:8b:1a:6f:6c:
            7d:29:d4:9b:57:df:e4:06:b8:9a:08:e7:76:b7:b3:
            f2:1f:52:bc:03:e1:ca:48:71:97:f5:07:cb:6a:14:
            1f:7d:e9
        Exponent: 65537 (0x10001)
    X509v3 extensions:
        X509v3 Subject Key Identifier:
            4C:9C:A5:B6:81:9E:9D:56:BC:E6:80:36:39:E5:3D:CB:17:35:E6:B4
        X509v3 Authority Key Identifier:
            keyid:4C:9C:A5:B6:81:9E:9D:56:BC:E6:80:36:39:E5:3D:CB:17:35:E6:B4
        X509v3 Basic Constraints:
            CA:TRUE

FIG. 8C

┌─ 820
```
Signature Algorithm: sha256WithRSAEncryption
    8c:59:2a:8b:2b:bd:d2:11:6f:06:c7:18:63:ca:96:5a:0f:41:
    c5:51:fb:0d:6c:53:b0:db:c5:c6:89:ab:31:86:cf:3c:4e:54:
    85:64:c7:94:08:1a:e0:a6:72:6c:aa:28:26:9d:18:62:95:fb:
    35:bf:7e:06:a5:d0:8f:7e:ca:f6:95:9f:a6:85:d9:ef:b3:0d:
    66:7c:a6:7f:77:99:78:1d:21:51:94:3b:5b:ed:a7:dc:e3:b5:
    ae:e8:6e:72:d3:20:81:12:33:62:df:63:11:61:43:e7:33:6d:
    f9:8b:bd:37:8b:f4:07:78:94:67:1d:85:f9:1d:84:59:d6:5c:
    7a:f8:07:2d:c1:12:1b:dd:59:99:17:ab:00:9a:94:14:e0:a9:
    b6:e3:cd:9c:40:ce:ea:7e:35:a0:d5:d2:ef:d9:2f:88:ef:8e:
    66:6b:a5:e1:c3:96:54:92:03:79:0a:bc:bf:62:8f:ff:2c:60:
    67:7d:a0:0b:e9:76:b4:74:79:9f:dd:ba:27:85:6d:42:38:4a:
    5a:f0:a8:4a:6a:0d:b7:2b:46:93:56:62:60:d5:a8:eb:ec:17:
    df:bd:57:83:ef:24:fa:5f:d2:b5:ec:8b:13:b1:b0:67:48:8f:
    95:9f:25:35:9b:08:31:a6:b5:65:1c:31:2d:05:3e:8c:c9:92:
    84:aa:77:60:a8:9b:3e:9b:ed:66:d5:18:0d:91:90:64:87:92:
    45:49:07:1e:67:6f:c2:ae:04:d2:d3:32:c5:28:21:08:67:af:
    20:28:c7:5b:86:3a:45:eb:4b:4a:d5:1c:ec:ad:f4:ed:77:44:
    21:d4:ae:ae:60:42:a4:0f:dd:2b:0d:ef:e0:e3:ae:cf:c8:4c:
    f2:48:a2:43:49:c4:f4:0f:1c:9a:bc:8f:31:02:4a:25:ca:fe:
    6e:26:37:4c:19:b8:34:b3:bc:6e:59:0e:dd:09:0a:b3:50:bb:
    9c:ba:b1:c9:4a:09:4e:21:12:9f:18:9a:00:c1:84:da:4f:bd:
    05:2d:3b:e0:fd:ef:80:94:35:8a:7a:ee:12:2b:a3:51:d8:14:
    c8:b2:4f:81:34:f9:73:1d:7b:b2:96:e3:c6:24:5a:1d:d2:7c:
    26:49:cb:1f:85:d4:f2:b5:6e:56:39:95:72:c0:31:f1:31:7e:
    21:6b:9a:e7:c4:a4:3c:42:b0:dd:f7:ad:d4:b5:fe:8e:96:74:
    c8:a7:93:79:f8:9c:d6:ed:f2:c7:98:21:8e:76:58:82:54:be:
    22:37:16:0a:4b:b6:fd:fe:9d:c5:3f:b0:bc:c4:ed:63:0f:84:
    19:16:c0:c8:13:d5:19:11:c4:dc:fb:07:11:1e:93:39:78:ab:
    9d:48:84:24:60:c6:f1:41

The public key is used to validate the signature, and it is extracted via
$ openssl x509 -in "public.crt" -pubkey -noout
-----BEGIN PUBLIC KEY-----
MIICIjANBgkqhkiG9w0BAQEFAAOCAg8AMIICCgKCAgEAwAmQ656WUStcZVnZl
M3g
eo5NUxLEW+2TdipvB7jAcODENli+0WmvlLbeYdMtciWPfagW5kJs4tJqmQIi4uKF
Is8yjHOgwPems8nR57H/nOJ85Fe2Idw00V2ibQ22GEJ6ZmFv0XHUJ6nGkzecE4fr
UewCJcSK+8Ya3INzgZ7UHFF9qOaCIP0gVay0kjmTmtkRYJZStDZ38n9y2zyiVf2x
xD6NQIrB3BDoGKCPHKto3L5oiokwF2HwUj/5OvLXeFklF8GwVVkKj1ms3FKAZ2yu
wd0kVVRG+mSNinfTSyITDZcv1i+UP5Y8hXYYaxqf6G/DoHaeke6K0rXggBdH8Ror
gxl39bQEEMXuu0S4hW0HAFUBGnShjr/BNFHZ28kmLRFPbjNiGcrONzMdSsREaJPc
ascEKYf9D4bhUnzD5hW1G3Yc1Ssb+tcm0E+cqz1s5inN706dg/1YDWss53vlPgYq
AcPozsdhqD0XepC4v397tE18aduKhWUFS0tRb0LaajiMmzskffIIf7GvTdCPE3X0
dTk83w1VQIDSBkEXPAOZlZXEyucsg6AT hyruwlnfVnmNPIfZJ6AD6yNJEQCLqPcy
mANPp72VD3O3aheZfo7Zm4SbZxnmOdTopP+RA4sab2x9KdSbV9/kBriaCOd2t7Py
H1K8A+HKSHGX9QfLahQffekCAwEAAQ==
-----END PUBLIC KEY-----
```

┌─────────────────────────────────────────────────────────────────────── 830
│ The public key is used to verify the signature in one command:
│ $ openssl dgst -sha256 -verify <(openssl x509 -in "public.crt" -pubkey -noout) -signature
│ signed-pw.sha256 pw.txt
│ Verified OK
│
│ That is the good case and the application should start and accept the secrets as they were
│ digitally signed and correct.
│
│
│ In the following example, the password was changed without authorization from "abc" to
│ "abcd".
│
│ $ echo "abcd">pw.txt
│
│ The application is able to detect that change:
│
│ $ openssl dgst -sha256 -verify <(openssl x509 -in "public.crt" -pubkey -noout) -signature
│ signed-pw.sha256 pw.txt
│ Verification Failure
│
│
│ **During the verification, there is a calculation of a sha256 hash sum of the password
│ ("abc") and the signed hash stored in signed-pw.sha256 is decrypted.
│ Afterwards, the application compares both strings. If they are the same, the signature is
│ valid, otherwise, the verification failed, and the secret may be rejected. A malicious
│ attacker is not able to adjust the signature because the sha256 hash is encrypted with the
│ private key to produce a signature, and that private key does not leave the build server,
│ which is a secure environment.
└───────────────────────────────────────────────────────────────────────

FIG. 8D

SECURELY PROCESSING SECRET VALUES IN APPLICATION CONFIGURATIONS

BACKGROUND

1. Field of the Invention

Embodiments of the invention relate to securely processing secret values in application configurations. The applications may be cloud applications.

2. Description of the Related Art

In application architectures, configuration values and secret values may be stored and loaded to external components. This may be achieved in multiple ways. Often this is implemented by using configuration ("config") files or environment variables.

Git may be described as a distributed version-control system for tracking changes in source code during software development. A git/subversion application architecture may include a source code repository, which may also be used to store secret values.

In some application architectures, a vault is used for storing secret values, but versioning is not always provided, and different parties may need to see configuration values but not the secret values.

In some application architectures, a credential store is used, but versioning is not provided.

In some application architectures, a private-public-key encryption/signing technique or a symmetric key encryption/signing technique is used, which may be referred to as a digital signature.

In some application architectures, a twelve-factor-app technique is used, in which configuration values may be decoupled from application code and may be stored in the environment.

SUMMARY

In accordance with embodiments, a computer-implemented method is provided for securely processing secret values in application configurations. The computer-implemented method comprises operations. A configuration file for an application is retrieved from a first repository, where the configuration file stores a configuration value and a link to a secret value in a second repository. The secret value is retrieved from the second repository using the link to the secret value in the configuration file. The configuration value is hashed to output a hashed configuration value and the secret value is hashed to output a hashed secret value. The hashed configuration value is signed, with a private key, to output a hashed and signed configuration value, and the hashed secret value is signed, with the private key, to output a hashed and signed secret value. The configuration value, the secret value, the hashed and signed configuration value, and the hashed and signed secret value are stored in a release file, where the configuration value and the secret value are environment variables. The application is executed using the release file.

In accordance with other embodiments, a computer program product is provided for securely processing secret values in application configurations. The computer program product comprises a computer readable storage medium having program code embodied therewith, the program code executable by at least one processor to perform operations. A configuration file for an application is retrieved from a first repository, where the configuration file stores a configuration value and a link to a secret value in a second repository. The secret value is retrieved from the second repository using the link to the secret value in the configuration file. The configuration value is hashed to output a hashed configuration value and the secret value is hashed to output a hashed secret value. The hashed configuration value is signed, with a private key, to output a hashed and signed configuration value, and the hashed secret value is signed, with the private key, to output a hashed and signed secret value. The configuration value, the secret value, the hashed and signed configuration value, and the hashed and signed secret value are stored in a release file, where the configuration value and the secret value are environment variables. The application is executed using the release file.

In yet other embodiments, a computer system is provided for securely processing secret values in application configurations. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A configuration file for an application is retrieved from a first repository, where the configuration file stores a configuration value and a link to a secret value in a second repository. The secret value is retrieved from the second repository using the link to the secret value in the configuration file. The configuration value is hashed to output a hashed configuration value and the secret value is hashed to output a hashed secret value. The hashed configuration value is signed, with a private key, to output a hashed and signed configuration value, and the hashed secret value is signed, with the private key, to output a hashed and signed secret value. The configuration value, the secret value, the hashed and signed configuration value, and the hashed and signed secret value are stored in a release file, where the configuration value and the secret value are environment variables. The application is executed using the release file.

BRIEF DESCRIPTION OF THE SEVERAL VIEWS OF THE DRAWINGS

Referring now to the drawings in which like reference numbers represent corresponding parts throughout:

FIG. 6 illustrates an example of key pair generation in accordance with certain embodiments.

FIGS. 7A and 7B illustrate signature generation by a secret resolution tool in accordance with certain embodiments.

FIGS. 8A, 8B, 8C, and 8D illustrate signature validation by an application in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
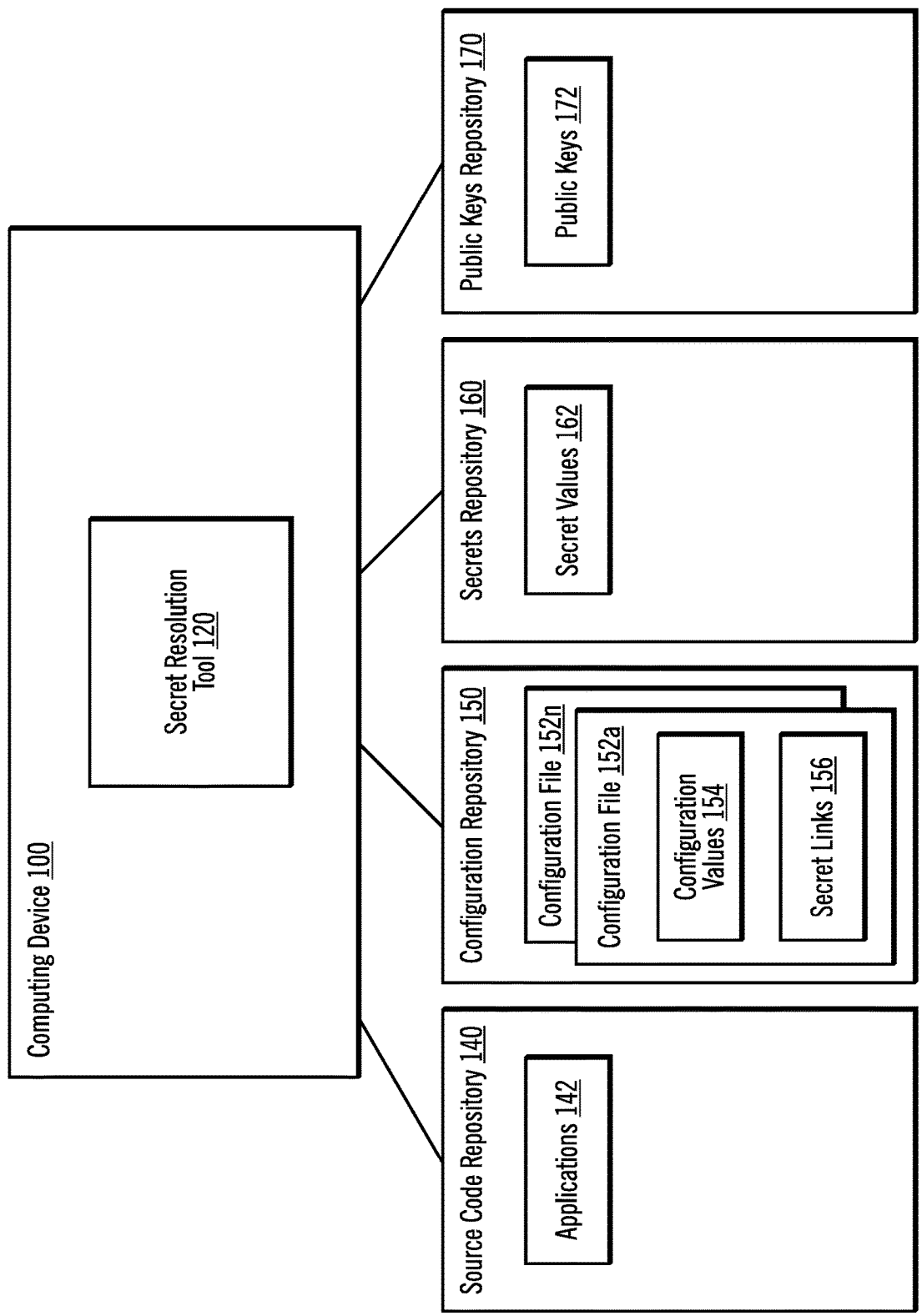
FIG. 1 illustrates, in a block diagram, a computing environment in accordance with certain embodiments.

FIG. 1 illustrates, in a block diagram, a computing environment in accordance with certain embodiments. A computing device 100 includes a secret resolution tool 120. The computing device 100 is coupled to a source code repository 140, a configuration repository 150 (also referred to as a "configuration source control repository"), a secrets repository 160 (also referred to as a "vault"), and a public keys repository 170.

In certain embodiments, the computing device 100 is a build server. In certain embodiments, the source code repository 140 and the configuration repository 150 may both be source controlled repositories.

The source code repository 140 may store applications 142 in the form of application source code, translated application code (e.g., executable code instead of application source code), or both of these.

The configuration repository 150 may store configuration files 152a . . . 152n in the form config.env files. Each configuration file 152a . . . 152n may store configuration values and secret links (i.e., references to secrets in the configuration values). For example, configuration file 152a stores configuration values 154 and secret links 156. The secrets repository 160 stores secret values 162. The public keys repository 170 stores public keys 172. In certain embodiments, the variables and parameters (values of variables) defined inside each configuration file 152a . . . 152n may be passed into an application 142 as environment variables. In certain embodiments, each configuration file 152a . . . 152n comprises a list of environment variables and their values available for an application 142.

The secret resolution tool 120 automatically combines versioned configuration values with current secret values from a secure location. The secret resolution tool 120 also provides a way of signing property values, which enables an application 142 to validate signatures in order to detect malicious changes to the configuration values. This enables cloud and multi-tenant applications 142 to detect and avoid an attack to a single application 142 that may expose data of multiple customers.

The secret resolution tool 120 separates the configuration files 152, application code of applications 142, and secret values 162 in different repositories. The secret resolution tool 120 identifies links to secrets in the configuration files and resolves the secrets (i.e., replaces the secrets with secret values) during the deployment of the application 142. The secret resolution tool 120 links secrets by using a link syntax as a value for entries in the secrets repository 160. The link syntax may be described as a format for describing a link to a secret value in the secrets repository 160. The secret resolution tool 120 provides a macro mechanism to transform configuration or secret values during the deployment process. The secret resolution tool 120 signs the configuration and secret values with a private key of the deploying party to allow optional integrity checks in the application code. A deploying party may be described as the individuals, team or entity responsible for deploying the application code to a target environment.

The secret resolution tool 120 stores the non-confidential data (configuration values) in a separate repository (configuration repository 150) than the application source code (which is stored in the application repository 14). Storing the configuration values separately allows adding new deployments (i.e., instances of an application) after the application has been released. An application may be said to be released when the code artifacts that make up the running application have been released to manufacturing or operations, having completed development and quality assurance processes. By having the configuration values and the application repositories separate (instead of merged), embodiments allow adding new deployments without adding changes in the commit history of the application code, which would lead to a new software build and release. Thus, embodiments use a strict separation of configuration from code.

By using a separate repository for non-secret configuration values, the application operator gains the same flexibility in terms of versioning and difference capabilities that developers are used to for their application source code. The difference ("diff") capabilities may be described as the ability to check differences between two versions of an artifact and highlighting changes (e.g., additions, modifications, deletions) tracked between the two versions. The secret values that are used to get access to systems or services (e.g., Virtual Machine (VM) login or database credentials) are stored outside the configuration repository 150 in a secrets repository 160 (e.g., a secure vault service). This allows teams to share their configuration values with the development team, without the need to expose secret values publicly.

The secret resolution tool 120 combines both data sources (configuration values and secret values) to form the final environment variables (e.g., as described in the Twelve-Factor-App, which may be used as blueprint for cloud native software). The secret resolution tool 120 produces and stores the configuration values long term and saves revisions. The secret resolution tool 120 defines a link syntax for the configuration file in the configuration repository 150, which allows linking to an external secret location in a secrets repository 160 (e.g., a vault).

The secret resolution tool 120 resolves the locations during the release process. The secret resolution tool 120 may be described as a deploying party on a build server. To resolve the secrets, the secret resolution tool 120 uses a token with read-only permission to the secrets repository 160. In certain embodiments, the owner of the secrets repository 160 may obtain the token directly from the secrets repository 160 during the initial setup. The token may be used to authenticate users to read secret entries stored in the secrets repository 160. This token may be passed to the secret resolution tool 120 as an environment variable. In certain embodiments, the token may also be a token against a third party authentication backend. For example, a token that is used to authenticate to obtain access to a vault for a local development setup may be passed to people in the right teams so that they may access certain secrets. As another example, the token may be used for integration against Lightweight Directory Access Protocol (LDAP) or other login Application Programming Interfaces (APIs). In certain embodiments, the token is comparable to a password, with the difference being that the token is usually generated and bound to a specific task of the associated account instead of a user password (which is usually defined by the user and is used for interactive interaction between a human and a system).

In certain embodiments, adding values to the configuration repository 150 may be done with a code change by a software developer, whereas the secrets repository 160 may be manipulated by operators/users with sufficient access to the secrets repository. The public keys repository 170 may be populated with the public key (e.g., the public key as part of a certificate) after the key generation process. The application code is able to retrieve the public key from the public keys repository 170 or contains the public key as part of the deployment package for deployment of the application.

The secret resolution tool 120 retrieves the configuration file from the configuration repository 150, expands internal variables, and parses the links (i.e., references of secrets) to the secrets repository 160. Expand refers to, within the same configuration file, once the variable is defined, that same variable may be referred to as an internal variable to reuse the value for another variable. For example, if there is a line that defines VAR1=value1, then later on in the same file, the internal variable for a line may be expanded to VAR2="${VAR1}".

The secret resolution tool 120 uses the read-only token to retrieve the secret values from the secrets repository 160 and combines the secret values with the configuration values. Depending on the deployment target, the environment variables may be directly set or may be persisted in a temporary file (i.e., a release file that may be named release.env), which is only readable by the deploying party. If a temporary file is used, it contains KEY=VALUE pairs and may be directly applied to the application environment variables by the deployment framework.

In certain embodiments, the configuration values for every deployment are stored in a separate folder in the source code repository 140 to be able to compare different deployments with regular diff tooling. This also has the benefit that change requests to deployment configuration may be handled like usual source code change requests. The software tool to retrieve secret values may be part of the configuration repository 150 to guarantee the compatibility between static configuration and processing parts. This also helps to change the used secrets repository technology while maintaining the Application Programming Interface (API) compatible with previous versions.

A vault is one of the options for the secrets repository 160. When secret entries are stored inside the vault, they are placed under corresponding vault spaces. Vault spaces are user-defined. Vault spaces help organize and group secret entries inside the vault. Also, the use of vault spaces provides a way to locate each secret entry inside the vault when retrieving the value for a secret. A vault space in that context may be seen as a logical separation. By using the VAULT_SPACE as a variable, the configuration files may remain nearly equal between different deployments, as the different VAULT_SPACE leads to loading of secrets from a different location.

The following is Example A of processing flow:

```
config file: dev-staging/config.env
VAULT_ADDR="https://myvault:8200"
SPACE="staging"
VAULT_SPACE="generic/project/${SPACE}/service-deployment-id"
CLOUD_API_KEY="VAULT:${VAULT_SPACE}/cloud_instance:cloud_api_key"
```

In Example A, the configuration file ("config file") indicates the name and location of the configuration file (dev-staging/config.env). The vault address ("VAULT_ADDR") indicates the location of the secrets repository 160. The space ("SPACE") indicates a logical location of the running application. The vault space ("VAULT_SPACE") indicates the logical separation in the vault. The key ("CLOUD_API KEY") indicates that "cloud_instance" is the entry in the secrets repository 160 and that "cloud_api_key" is the attribute to choose of that entry.

In certain embodiments, the deploying party is on a build server. The command to invoke the secret resolution tool 120 is a release command that accepts parameters to define the configuration file and release file locations. The following Example B shows use of the release command:

```
$ checkout config from configRepository
$ export VAULT_USER=exampleuser
$ export VAULT_TOKEN=examplepassword
$ release \
    --configFile dev-staging/config.env \
    --releaseFile ${WORKSPACE}/dist/release.env
$ deploy/run ...
```

In Example B, the configuration file is retrieved from the configuration repository ("configRepository"). The variable VAULT_USER identifies the requesting party ("exampleuser"), which makes it easy to trace on the secrets repository 160 who gained access to which secret values. The variable VAULT_TOKEN contains the read-only token ("examplepassword") to retrieve the secrets from the secrets repository 160. In response to the release command being issued, the secret resolution tool 120 retrieves secret values and combines the secret values with the configuration values stored in the configuration file to a release file ("dist/release.env"):. Then, the application may be deployed and run.

The release file for Example B may be:

```
VAULT_ADDR="https://myvault:8200"
SPACE="staging"
VAULT_SPACE="generic/project/staging/service-deployment-id"
CLOUD_API_KEY="examplesecret"
```

In the release file, the key now includes the secret value, instead of a link to the secret value.

In addition to Example B, there are other use cases that may be solved by extending the base capability. In certain embodiments, it is possible to reference secret values multiple times in the same configuration file, but in different formats. For example, an application may contain multiple micro-services that are sharing certain configuration values, but in different formats. Micro-service A may need the same username and password to an external API as separated values, whereas micro-service B may need them to be encoded as basic authentication HyperText Transfer Protocol (HTTP) header. If the application does not create the basic authentication headers itself and, instead, is requiring a base64 encoded string based on username and password concatenated with a colon, the release file may solve this by providing a macro mechanism for: BASE_64_ENCODE{{ }}, which is an example macro that will transform the provided input into the encoded string.

The following Example C uses a macro:

```
DB_USER="VAULT:${VAULT_SPACE}/connection:user"
DB_PASSWORD="VAULT:${VAULT_SPACE}/connection:password"
BASIC_AUTH_HEADER=
   "Basic
   BASE_64_ENCODE{{${DB_USER}:${DB_PASSWORD}}}"
```

In Example C, the macro BASE_64_ENCODE is used to encode the secret value for use by the application.

With embodiments, the macro mechanism may be extended to, for example, provide functionality, such as, ENCRYPT{{value,key}} and DECRYPT{{ciphertext, key}} if some keys were already stored as encrypted values in the secrets repository 160.

With embodiments, there may also be linked secrets. Linked secrets may be described as references stored as values in the secrets repository 160, which are interpreted by the secret resolution tool 120 as another secret address. For example, in case the secrets repository location has been migrated or the technology has changed, such migration may be performed by linking from the old location to the new location.

The following Example D shows a liked secret:

```
   config.env ->
   lookup(VAULT:${VAULT_SPACE}/connection:password) ->
returns
   VAULT:differentspace/migratedconnection:password ->
   lookup(VAULT:differentspace/migratedconnection:password) ->
   returns: xxx
```

With embodiments, to prevent endless loops in the resolution process by having circular references, the secret resolution tool 120 internally builds a resolution tree and directly raises an error as soon as the same path is taken a second time.

In certain embodiments, the hash is a cryptographic hash function. In certain embodiments, the cryptographic hash function maps data of arbitrary size to a bit string of a fixed size (a hash). The hash is created by a one-way hashing formula. The input data of the cryptographic hash function may be referred to as the message, while the output data of the cryptographic hash function may be referred to as the hash, hash value, digest or message digest.

In various embodiments, any hash function may be used. In certain embodiments, a Secure Hash Algorithm (SHA) (e.g. the SHA-256 hash function) is used (where the SHA-256 hash function generates an almost-unique, fixed size 256-bit (32-byte) hash. In certain embodiments, the Rivest-Shamir-Adleman (RSA) public-private key cryptosystem is used to sign the hash value. However, any hash function that has a low risk of collisions (i.e., multiple inputs should not produce the same hash string) and a secure public-private key cryptosystem may be used. The hash function and the public-private key cryptosystem form the digital signature.

To validate a signature in the application, the public key must be distributed to the application, e.g. by a Public Key Infrastructure (PKI) or by including the public key in the deployment package.

In certain embodiments, the secret resolution tool 120 provides a built-in proof of configuration integrity. For example, it may be the case that an attacker is hacking an application and rewriting configuration (e.g., to send all database requests to a compromised proxy server ("man-in-the-middle attack") in order to steal user information). Therefore, the secret resolution tool 120 provides the option to sign each hash of a configuration value and/or each hash of a secret value with a private key of the deploying party.

Then, the public key may be fetched by the application code to validate that the configuration was set by the trusted party when the application code loads the configuration values and the secret values. This is especially useful if the application code is compiled and the check cannot be removed easily by the attacker without reverse engineering the application code. To use the signing feature, the same config.env file as described (e.g., in Example A) may be used. The public key of the deploying party may be placed on and retrieved from a public server.

The following Example E shows a configuration file:

```
config file: dev-staging/config.env
DB_URL="https://mydb.com"
DB_USER="VAULT:${VAULT_SPACE}/connection:user"
DB_PASSWORD="VAULT:${VAULT_SPACE}/connection:password"
LOG_LEVEL="info"
```

The secret resolution tool 120 may be invoked with parameters to retrieve secret values defined in the configuration file, calculate message digests of all configuration values and secret values, and sign those digests with the private key of the deploying party.

The following example E shows the release command with signing:

```
   $ release --sign --privKey=~/private.key -c dev-stag-
   ing/config.env
```

The secret resolution tool 120 writes the signed lines into the release.env file by appending additional properties matching a certain syntax (e.g., a suffix_SIGNED may be appended to the original values). The following Example G is output of the secret resolution tool 120:

```
dev-staging/config.env
DB_URL="https://mydb.com"
DB_URL_SIGNED="signedDbUrlHash"
DB_USER="VAULT:${VAULT_SPACE}/connection:user"
DB_USER_SIGNED="signedDbUserHash"
DB_PASSWORD="VAULT:${VAULT_SPACE}/connection:password"
DB_PASSWORD_SIGNED="signedDbPasswordHash"
LOG_LEVEL="info"
LOG_LEVEL_SIGNED="signedLogLevelHash"
```

The signed config.env file may be checked in into the configuration repository 150 again without exposing the actual secret values or the private key. Afterwards the secret resolution tool 120 may be used to load secrets as shown in the following Example H:

```
   $ export VAULT_USER=exampleuser
   $ export VAULT_PASSWORD=examplepassword
   $ release \
```

-continued

```
    --configFile dev-staging/config.env \
    --releaseFile ${WORKSPACE}/dist/release.env
dist/release.env
DB_URL="https://mydb.com"
DB_URL_SIGNED=" signedDbUrlHash"
DB_USER="resolvedUser"
DB_USER_SIGNED="signedDbUserHash"
DB_PASSWORD="resolvedPw"
DB_PASSWORD_SIGNED="signedDbPasswordHash"
LOG_LEVEL="info"
LOG_LEVEL_SIGNED="signedLogLevelHash"
```

In Example H, the application developer decided to consider DB_URL, DB_USER and DB_PASSWORD as sensitive configuration values, whereas LOG_LEVEL is not treated as a sensitive configuration value. When the application starts and parses the configuration file for the environment variables, the application may validate the value of DB_USER by decrypting DB_USER_SIGNED with the public key of the deploying party and comparing hash values: (decrypt(DB_USER_SIGNED, PUBKEY)== (DB_USER)). In certain embodiments, if they match, the value is accepted, otherwise the application logs an error and crashes to prevent data from being leaked and to indicate that some attack happened. In certain embodiments, as application monitoring detects crashes most likely with the highest priority, this security breach is reported automatically. The described signing and validation process of hash values protects the application in multiple ways. The signing and validation ensures that an attacker cannot change values (e.g., the database connection) by including code in the configuration repository 150 because the new hash signature cannot be created without the private key. The signing and validation also protects the application from malicious changes applied directly in the secrets repository 160, as the calculated hash of the secret value inside the application code will not match the hashed and signed secret value stored in the configuration repository 150.

On the other hand, uncritical configuration changes may be applied directly in the application environment (e.g., if an operator needs to reconfigure the LOG_LEVEL in an already deployed instances as the application decides to not validate the signature for the LOG_LEVEL variable).

In case an operator needs to change credentials (e.g., due to password policies), the credentials may be changed in the secrets repository 160, resolved, signed by the secret resolution tool 120, and pushed back into the configuration repository 150. Those changes become available in the application on the next deployment or configuration update process, which may be triggered automatically as code repositories notify the building party on changes.

Figure 2:
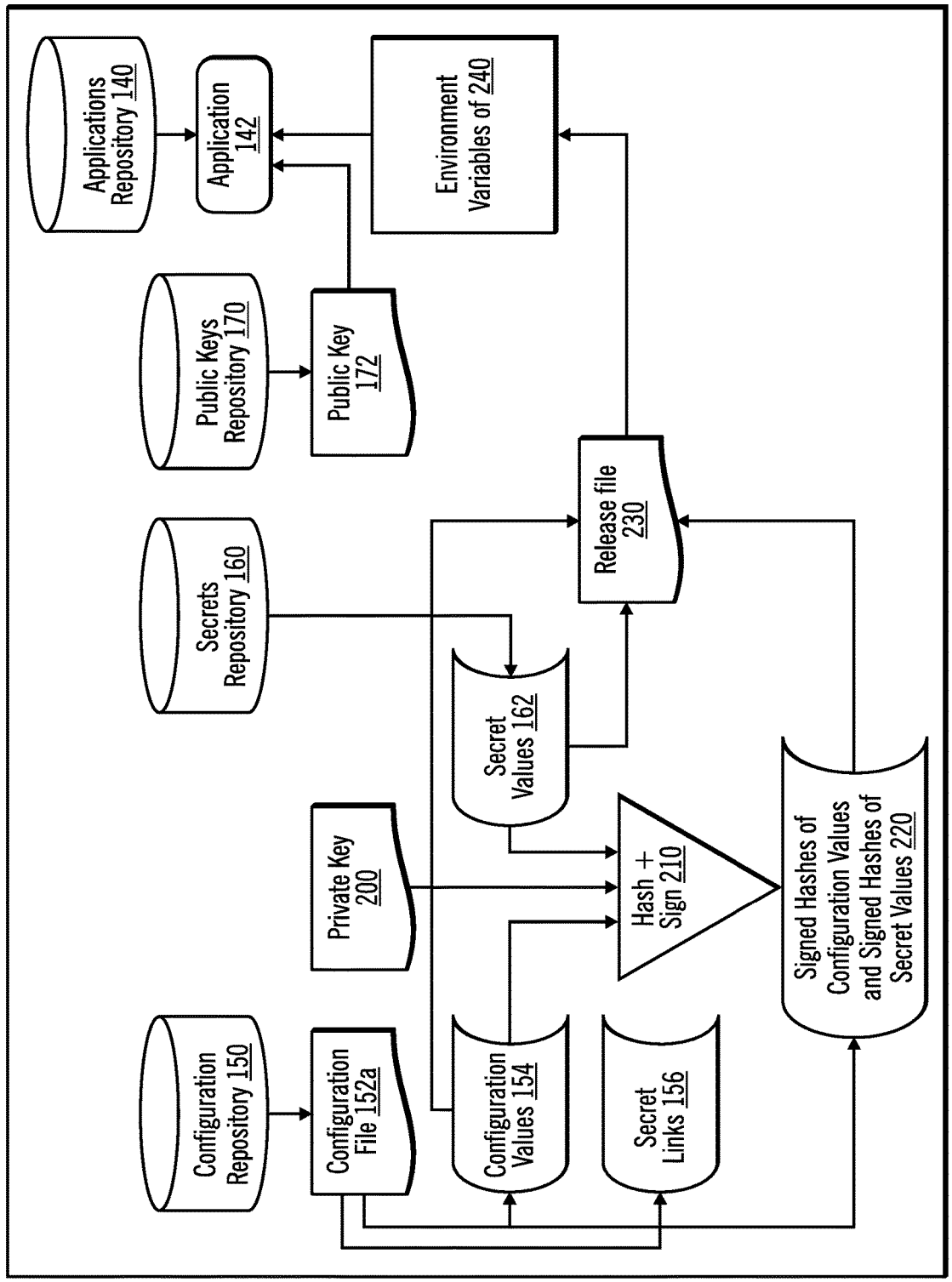
FIG. 2 illustrates, in a block diagram, operations for securely processing secret values in accordance with certain embodiments.

FIG. 2 illustrates, in a block diagram, operations for securely processing secret values in accordance with certain embodiments. The secret resolution tool 120 retrieves a configuration file 152a from the configuration repository 150 for the application to be executed. In certain embodiments, there is one configuration file per application per each environment the application is deployed to. In certain embodiments, the configuration file is identified by using the application name as a prefix in the name of the configuration file. For example, file names may be in the format of app1_config.env, app2_config.env etc. The configuration file includes configuration values 154 and secret links 156. The secret resolution tool 120 retrieves secret values 162 from the secrets repository 160 using the secret links 156. The secret resolution tool 120 also retrieves a private key 200, which is only available to the party/system executing the secret resolution tool 120. In block 210, the secret resolution tool 120 hashes the configuration values 154 and signs the hashed configuration values with the private key 200. In block 210, the secret resolution tool 120 also hashes the secret values 162 and signs the hashed secret values with the private key 200. The signing is used to provide a proof that the values were not changed without authorization. The signing may be described as encrypting. The secret resolution tool 120 outputs signed hashes of configuration values and signed hashes of secret values 220 (i.e., the hashed and signed configuration values and the hashed and signed secret values). The secret resolution tool 120 stores the configuration values 154, the secret values 162, the signed hashes of configuration values (i.e., the hashed and signed configuration values), and the signed hashes of secret values 220 (i.e., the hashed and signed secret values)in the release file 230. That is, the actual secret values may be saved in the release file 230 because the release file 230 is created during the deployment of the application and destroyed right after the deployment, which avoids the secret values from being exposed.

The application 142 retrieves a public key 172 from the public keys repository 170 and uses the public key to decrypt the encrypted hash (signature validation). Then a hash is calculated from the plain configuration/secret value and compared against the decrypted hash. If both hashes match, the original build server defined the secret and the digital signature was validated successfully, and the configuration values and the secret values may be used as environment variables 240. In certain embodiments, the application 142 may decide on which value the signature must match (e.g., so that database connections cannot be changed manually, whereas a logging level may be reconfigured manually by an operator). For example, if the logging level were changed manually, the hashes would not match, but the application 142 may ignore that in this case. Then, the configuration values and the secret values are used as the environment variables of the application 142 (the running process). Thus, with embodiments, the application 142 is able to execute with the secret values, which have been securely processed.

In case the public key is stored as an X.509 certificate, a central Certificate Authority (CA) may be used. X.509 may be described as a standard that defines the format of public key certificates. The central CA decides whether a key belongs to a trustworthy identity and signs/encrypts the public key certificate. The public key of the public key certificate from the central CA may be used by the application to validate whether the public key of a build server should be trusted for validating the signatures. This extension may help to reuse existing key infrastructure that might be already available in an organization to support the encryption of HTTP traffic and may help to rotate expiring public keys, as X.509 certificates contain an expiration date. If the public key gets rotated, the application receives an updated hashed and signed version of the values, usually by updating the environment variables or by redeployment of the application.

Figure 3:
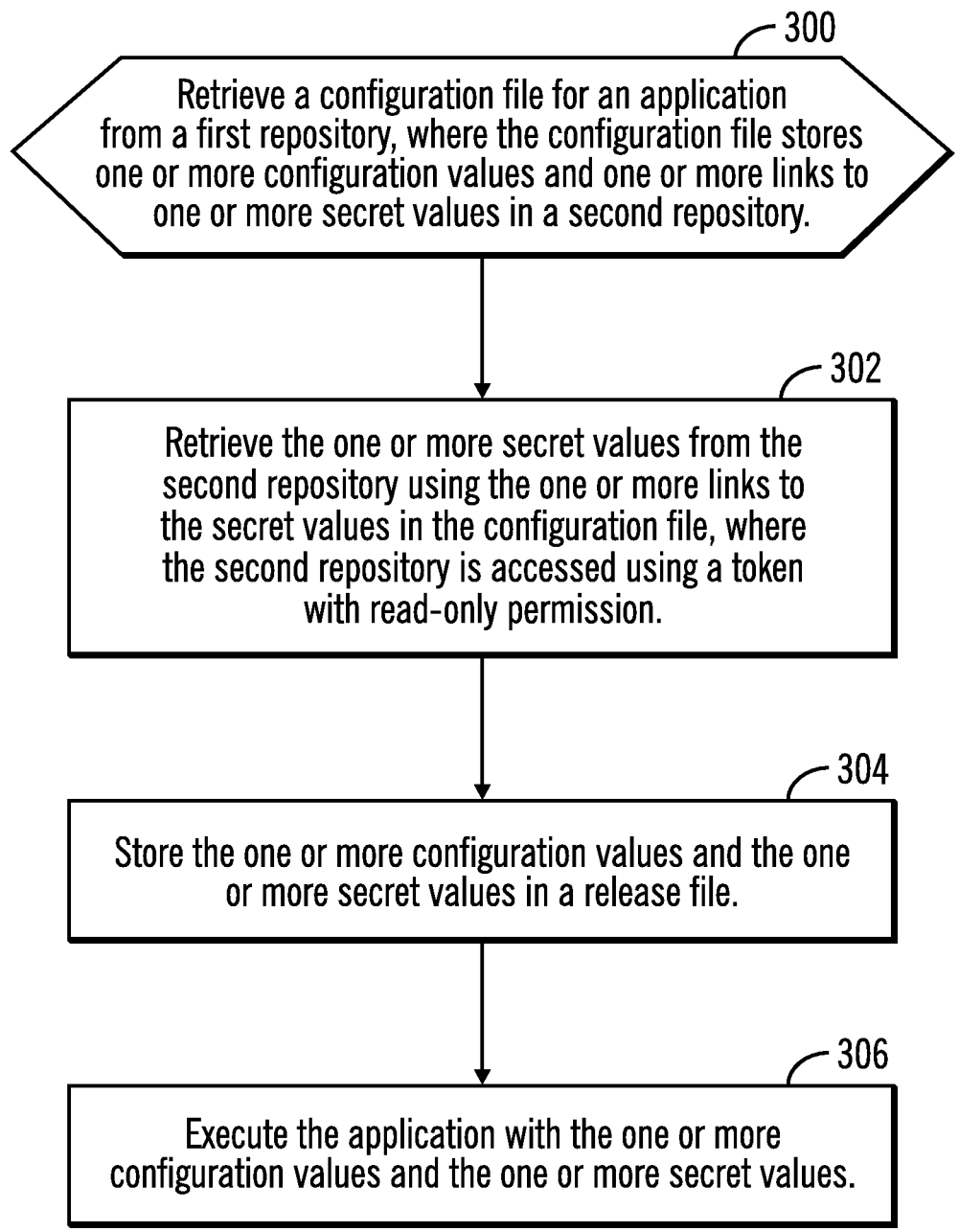
FIG. 3 illustrates, in a flowchart, operations for securely processing secret values in accordance with certain embodiments.

FIG. 3 illustrates, in a flowchart, operations for securely processing secret values in accordance with certain embodiments. Control begins at block 300 with the secret resolution tool 120 retrieving a configuration file for an application from a first repository, where the configuration file stores one or more configuration values and one or more links to one or more secret values in a second repository. In block 302, the secret resolution tool 120 retrieves the one or more secret values from the second repository using the one or more links to the secret values in the configuration file, where the second repository is accessed using a token with read-only permission. In block 304, the secret resolution tool 120 stores the one or more configuration values and the one or more secret values in a release file. In block 306, the secret resolution tool 120 executes the application with the one or more configuration values and the one or more secret values.

Figure 4:
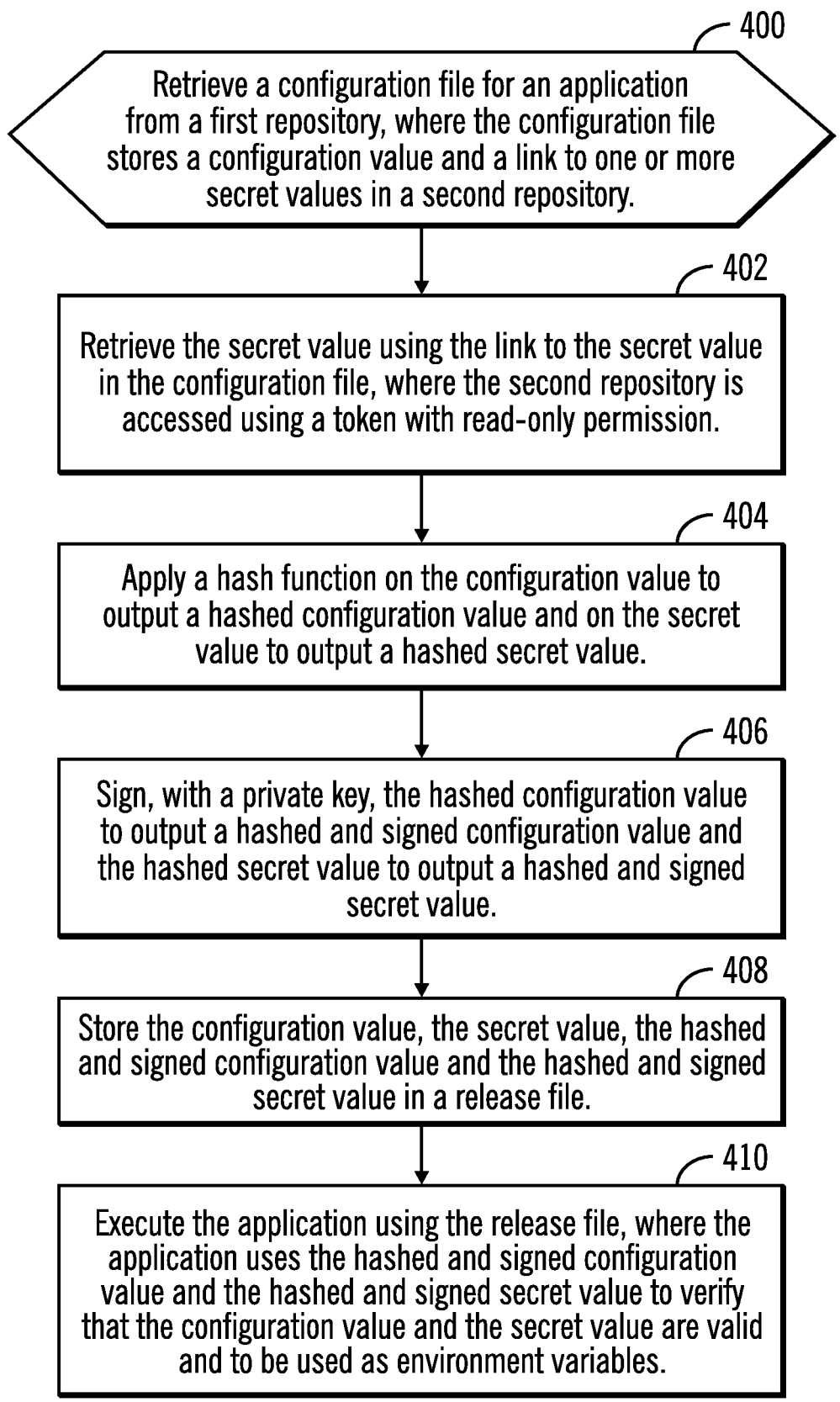
FIG. 4 illustrates, in a flowchart, operations for securely processing secret values using a private key in accordance with certain embodiments.

FIG. 4 illustrates, in a flowchart, operations for securely processing secret values using a private key in accordance with certain embodiments. Control begins at block 400 with the secret resolution tool 120 retrieving a configuration file for an application from a first repository, where the configuration file stores a configuration value and a link to one or more secret values in a second repository. In block 402, the secret resolution tool 120 retrieves the secret value using the link to the secret value in the configuration file, where the second repository is accessed using a token with read-only permission. In certain embodiments, the link includes a macro, and the secret resolution tool 120 executes the macro to modify the secret value that was retrieved using the link. In certain embodiments, the link is a first link that refers to a second link in the second repository (instead of referring to a secret value in the second repository). In such embodiments, the secret resolution tool 120 uses the first link to retrieve the second link, and uses the second link to retrieve the secret value from a third repository. In certain embodiments, macros may be used on configuration values.

In block 404, the secret resolution tool 120 applies a hash function on the configuration value to output a hashed configuration value and on the secret value to output a hashed secret value. In certain embodiments, different hash functions may be applied to the configuration value and to the secret value. In block 406, the secret resolution tool 120 signs, with a private key, the hashed configuration value to output a hashed and signed configuration value and the hashed secret value to output a hashed and signed secret value. Signing may be described as encrypting. In block 408, the secret resolution tool 120 stores the hashed and signed configuration value and the hashed and signed secret value in a release file. In block 410, the secret resolution tool 120 executes the application, where the application uses the hashed and signed configuration value to verify that the configuration value is valid and uses the hashed and signed secret value to verify that the secret value is valid. If the configuration value and the secret value are valid, they may be used as configuration values. In certain embodiment, the application is executed, and the application obtains the configuration value, the hashed and signed configuration value, the secret value and the hashed and signed secret value from the release file or the application environment variables, if the deployment tool has set those based on the release file content.

Figure 5:
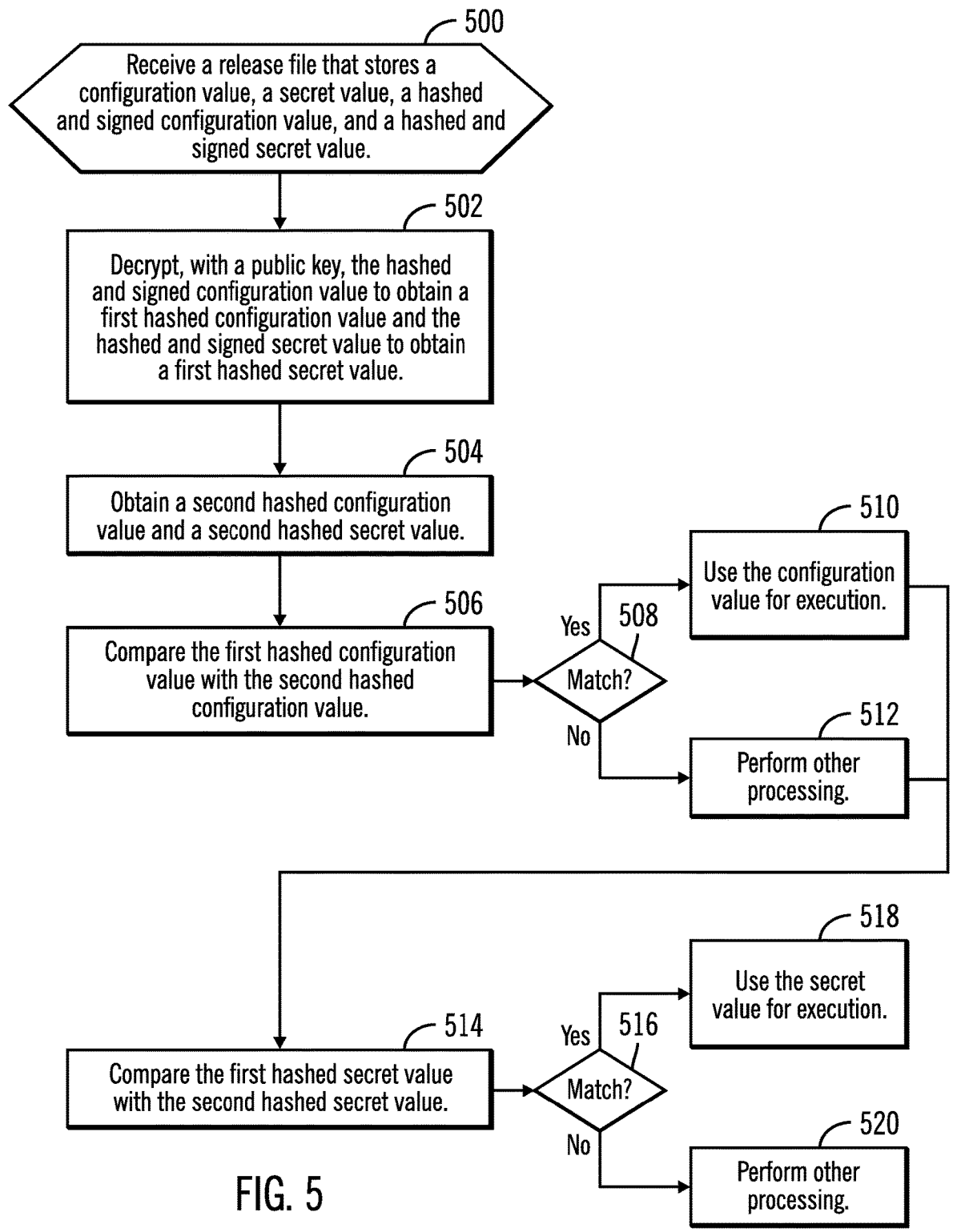
FIG. 5 illustrates, in a flowchart, operations for determining whether a configuration value and a secret value are valid in accordance with certain embodiments.

FIG. 5 illustrates, in a flowchart, operations for determining whether a configuration value and a secret value are valid (e.g., not modified by someone without authority to do so) in accordance with certain embodiments. Control begins at block 500 with the application 142 receiving a release file that stores a configuration value, a secret value, a hashed and signed configuration value, and a hashed and signed secret value. In block 502, the application 142 decrypts the hashed and signed configuration value to obtain a first hashed configuration value (e.g., a decrypted and hashed configuration value) and the hashed and signed secret value to obtain a first hashed secret value (e.g., a decrypted and hashed secret value).

In block 504, the application 142 obtains a second hashed configuration value and a second hashed secret value. In certain embodiments, the application 142 hashes the configuration value in the release file to obtain the second hashed configuration value and hashes the secret value in the release file to obtain the second hashed secret value.

In block 506, the application 142 compares the first hashed configuration value with the second hashed configuration value. In block 508, the application 142 determines whether there is a match of the first hashed configuration value and the second hashed configuration value. If so, processing continues to block 510, otherwise, processing continues to block 512. In block 510, the application 142 uses the configuration value for execution. In block 512, the application 142 performs other processing. In certain embodiments, if there is no match, the application 142 may determine whether the particular configuration value is one that may be modified (e.g., a logging level), and, if so, the application 142 may continue execution using the modified configuration value. In other embodiments, the application 142 may determine that execution cannot continue and may terminate processing, send a notification, etc. From blocks 510 or 512, processing continues to block 514.

In block 514, the application 142 compares the first hashed secret value with the second hashed secret value. In block 516, the application determines whether there is a match of the first hashed secret value and the second hashed secret value. If so, processing continues to block 518, otherwise, processing continues to block 520. In block 518, the application 142 uses the secret value for execution. In block 520, the application 142 performs other processing. In certain embodiments, if there is no match, the application 142 may determine whether the particular secret value is one that may be modified, and, if so, the application 142 may continue execution using the modified secret value. In other embodiments, the application 142 may determine that execution cannot continue and may terminate processing, send a notification, etc.

In certain embodiments, the retrieval of the release file happens in the deployment process of the application, which injects the environment variables from the release file into the running application. The validation of the content happens inside the application.

Merely to enhance understanding, an example is provided with reference to FIGS. 6-8. FIG. 6 illustrates an example of key pair generation 600 in accordance with certain embodiments. This example uses an OpenS SL® toolkit, which is a toolkit for the Transport Layer Security (TLS) and Secure Sockets Layer (SSL) protocols. (OpenSSL is a registered trademark of the OpenSSL Software Foundation in the United States and/or other countries.) In the example of FIG. 6, a private key and a public key are generated. In certain embodiments, the private key may expire in one year so that there is a new private key generated to enable rotation of private keys.

In certain embodiments, a tool may be used to generate the private key and the public key (public key as part of a certificate). Then, the secret resolution tool 120 may uses the private key and the public key. In other embodiments, the secret resolution tool 120 may generate the private key and the public key.

FIGS. 7A and 7B illustrate signature generation 700, 710 by the secret resolution tool 120 in accordance with certain embodiments. In this example, as the signed-pw.sha256 file contains bytes and not printable characters, it is converted to base64 to include it into the release.env, but other codecs, such as, hexadecimal may be used.

FIGS. 8A, 8B, 8C, and 8D illustrate signature validation 800, 810, 820, 830 by an application 142 in accordance with certain embodiments. Initially, the application 142 retrieves values from the release.env file as environment variables when the application process gets started. The application 142 performs validation (which may be referred to as verification) to determine whether the secret value is unchanged. If the secret value is unchanged, the application uses the secret value. If the application detects that the secret value is changed, and so there is a validation failure, the application may decide whether that secret value is allowed to be changed manually or whether only trusted parties (in that case the build server) are allowed to change the secret value. In the latter case, the application may notify a person or to crash the process.

Although, it is also not always possible to see directly who changed configuration values and secret values on a system and whether those values are trustworthy, embodiments provide a process of efficiently storing and retrieving the configuration values and secret values in a secure manner during deployment and runtime.

Some application architectures using a vault to store secret values do not make it possible to easily compare previous settings with current settings, and so such a vault is not feasible to reliably store configuration values and secret values that may need to be restored during a rollback of an application deployment. However, embodiments, enable easy comparison of previous settings with current settings to allow restoring configuration values and secret values for rollback of the application deployment.

In certain embodiments, the secret resolution tool 120 combines configuration values from a source code repository 140 via a defined syntax with secret values from a secrets repository 160 and transforms into an application configuration used by applications during runtime.

In certain embodiments, the secret resolution tool 120 provides configuration management during the deployment of an application. The secret resolution tool 120 stores, for the application, a configuration file in a first repository and stores secret values in a second repository. The secret resolution tool 120 defines a syntax for the configuration file that allows linking to the second repository. For code deployment, the secret resolution tool 120 resolves the links by: retrieving the configuration file from the first repository, expanding configuration variables and parsing references (links) of secrets to the second repository, and using a token with read-only permission to the second repository to retrieve the secret values from the second repository and combine them with the configuration values of the configuration file.

In certain embodiments, the secret resolution tool 120 securely processes secret values in application configuration by fetching secret values, transforming the secret values and configuration values, and storing the secret values and configuration values in an application configuration as environment variables. Thus, with embodiments, no files are persisted, but environment variables of the application are kept in memory.

In certain embodiments, the secret resolution tool 120 provides a mechanism to fully automate deployments of applications without human interaction and has a general concept of a configuration format, independent of the target cloud node or even on-premise node.

In certain embodiments, the secret resolution tool 120 provides full automation without any user interface interaction. The secret resolution tool 120 enables full deployment of an application that is scriptable by defining a lookup and transformation syntax that may be stored by version control software.

In certain embodiments, the secret resolution tool 120 enables the combination and transformation of configuration and secret values into an application runtime configuration.

Figure 9:
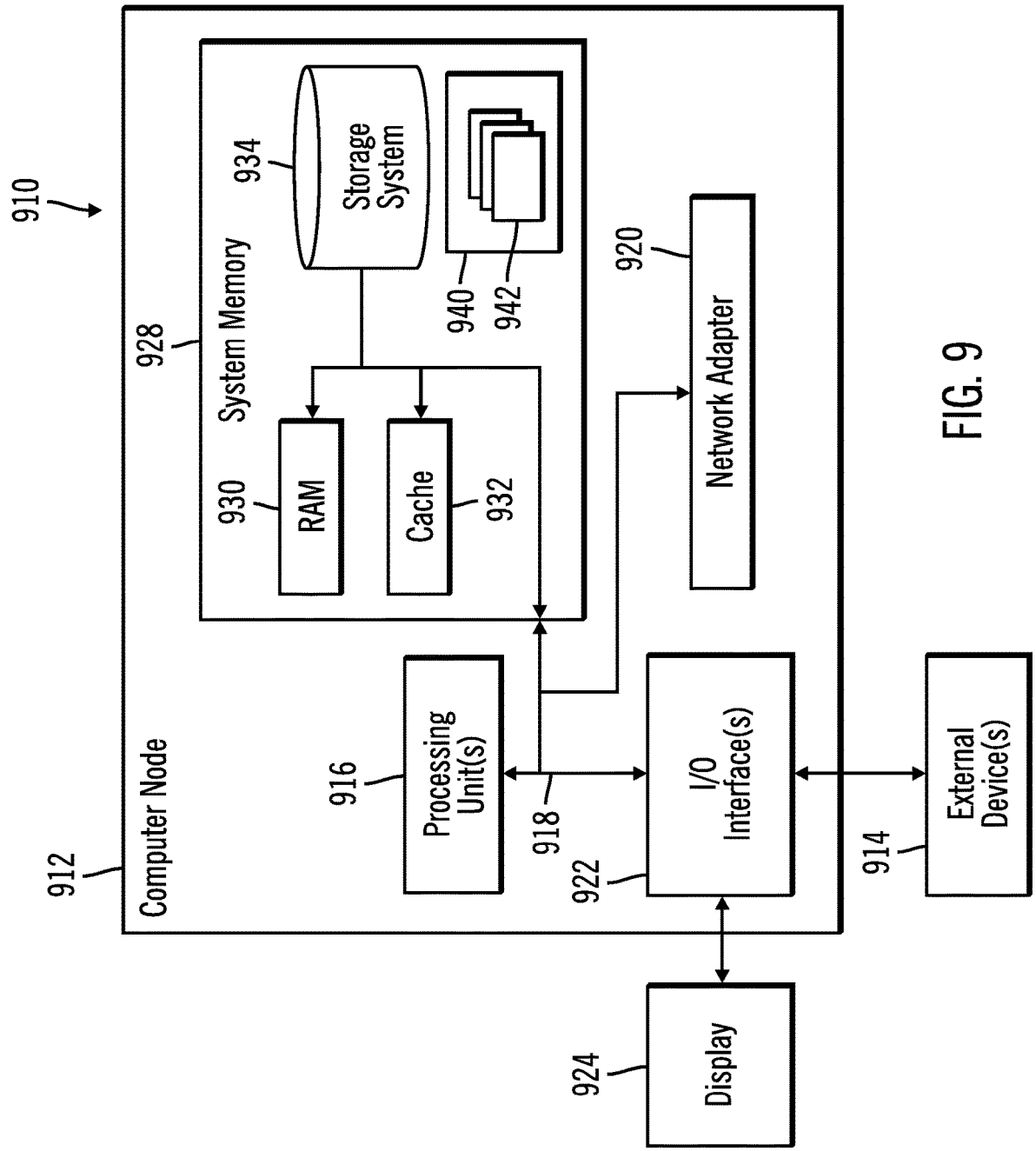
FIG. 9 illustrates a computing node in accordance with certain embodiments.

FIG. 9 illustrates a computing environment 910 in accordance with certain embodiments. In certain embodiments, the computing environment is a cloud computing environment. Referring to FIG. 9, computer node 912 is only one example of a suitable computing node and is not intended to suggest any limitation as to the scope of use or functionality of embodiments of the invention described herein. Regardless, computer node 912 is capable of being implemented and/or performing any of the functionality set forth hereinabove.

The computer node 912 may be a computer system, which is operational with numerous other general purpose or special purpose computing system environments or configurations. Examples of well-known computing systems, environments, and/or configurations that may be suitable for use with computer node 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 912 may be described in the general context of computer system executable instructions, such as program modules, being executed by a computer system. Generally, program modules may include routines, programs, objects, components, logic, data structures, and so on that perform particular tasks or implement particular abstract data types. Computer node 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 912 is shown in the form of a general-purpose computing device. The components of computer node 912 may include, but are not limited to, one or more processors or processing units 916, a system memory 928, and a bus 918 that couples various system components including system memory 928 to one or more processors or processing units 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 912 typically includes a variety of computer system readable media. Such media may be any available media that is accessible by computer node 912, and it includes both volatile and non-volatile media, removable and non-removable media.

System memory 928 can include computer system readable media in the form of volatile memory, such as random access memory (RAM) 930 and/or cache memory 932.

Computer node 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, system memory 928 may include at least one program product having a set (e.g., at least one) of program modules that are configured to carry out the functions of embodiments of the invention.

Program/utility 940, having a set (at least one) of program modules 942, may be stored in system memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer node 912 may also communicate with one or more external devices 914 such as a keyboard, a pointing device, a display 924, etc.; one or more devices that enable a user to interact with computer node 912; and/or any devices (e.g., network card, modem, etc.) that enable computer node 912 to communicate with one or more other computing devices. Such communication can occur via Input/Output (I/O) interfaces 922. Still yet, computer node 912 can communicate with one or more networks such as a local area network (LAN), a general wide area network (WAN), and/or a public network (e.g., the Internet) via network adapter 920. As depicted, network adapter 920 communicates with the other components of computer node 912 via bus 918. It should be understood that although not shown, other hardware and/or software components could be used in conjunction with computer node 912. Examples, include, but are not limited to: microcode, device drivers, redundant processing units, external disk drive arrays, RAID systems, tape drives, and data archival storage systems, etc.

In certain embodiments, the computing device 100 has the architecture of computer node 912. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
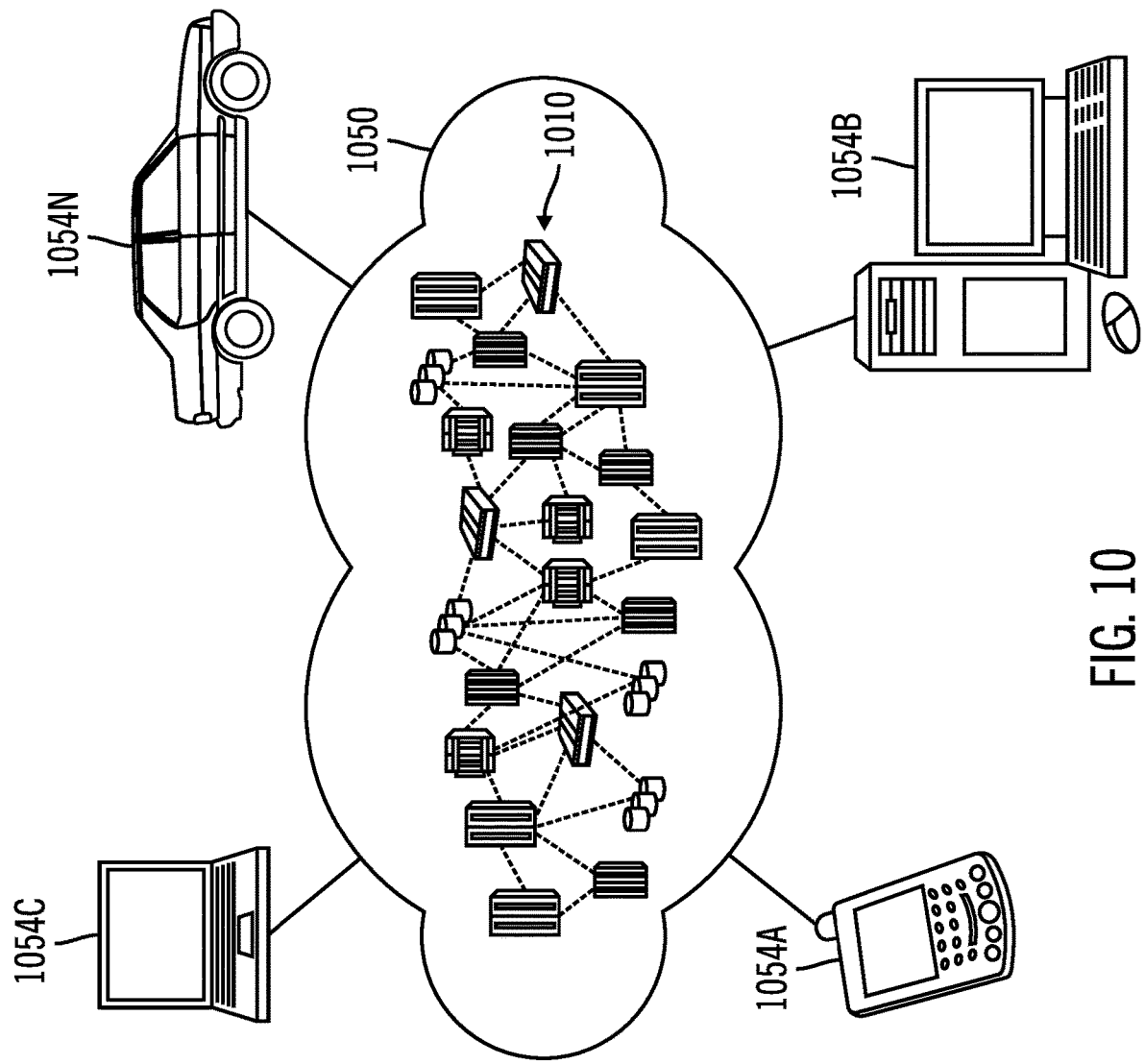
FIG. 10 illustrates a cloud computing environment in accordance with certain embodiments.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
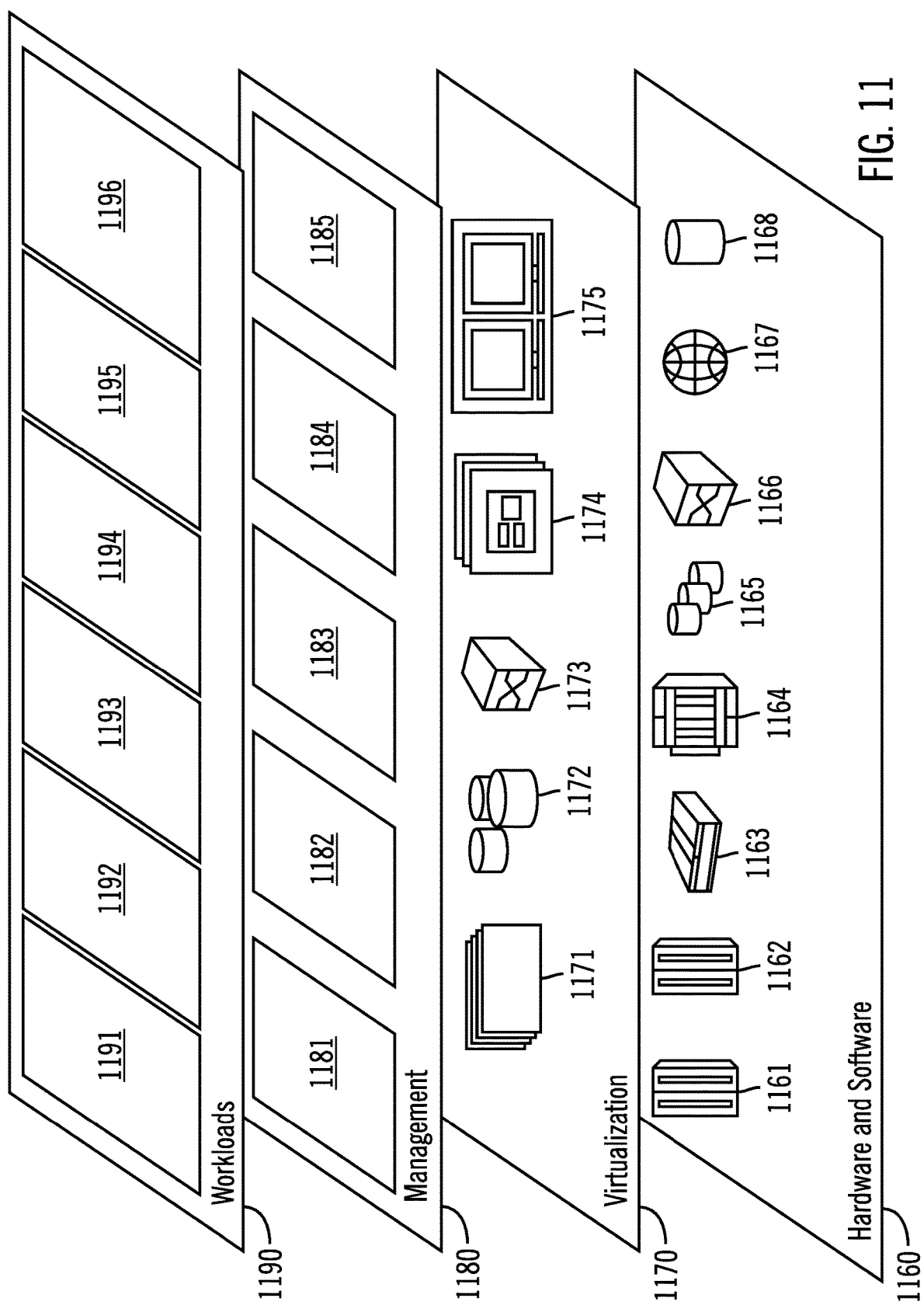
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and securely processing secret values in application configurations 1196.

Thus, in certain embodiments, software or a program, implementing secure processing of secret values in application configurations in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
retrieving a configuration file for an application from a first repository, wherein the configuration file stores a configuration value and a link to a secret value in a second repository;
retrieving the secret value from the second repository using the link to the secret value in the configuration file;
hashing the configuration value to output a hashed configuration value;
hashing the secret value to output a hashed secret value;
signing, with a private key, the hashed configuration value to output a hashed and signed configuration value;
signing, with the private key, the hashed secret value to output a hashed and signed secret value;
storing the configuration value, the secret value, the hashed and signed configuration value, and the hashed and signed secret value in a release file, wherein the configuration value and the secret value are environment variables; and
executing the application using the release file.

2. The computer-implemented method of claim 1, wherein the configuration file stores a plurality of links, and further comprising operations for:
determining that a link of the plurality of links includes a macro; and
executing the macro to modify the secret value retrieved using the link.

3. The computer-implemented method of claim 1, wherein the configuration file stores a plurality of links, wherein a first link of the plurality of links comprises a reference to a second link of the plurality of links in the second repository, and wherein the second link is used to retrieve the secret value in a third repository.

4. The computer-implemented method of claim 1, wherein the application:
decrypts, with a public key, the hashed and signed configuration value to obtain a decrypted and hashed configuration value and the hashed and signed secret value to obtain a decrypted and hashed secret value;
compares the hashed configuration value with the decrypted and hashed configuration value to determine whether the configuration value is valid; and
compares the hashed secret value with the decrypted and hashed secret value to determine whether the secret value is valid.

5. The computer-implemented method of claim 4, further comprising operations for:
accessing the second repository using a token with read-only permission.

6. The computer-implemented method of claim 1, further comprising operations for:
invoking a release command with parameters for a location of the configuration file and a location of the release file.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations for:
retrieving a configuration file for an application from a first repository, wherein the configuration file stores a configuration value and a link to a secret value in a second repository;
retrieving the secret value from the second repository using the link to the secret value in the configuration file;
hashing the configuration value to output a hashed configuration value;
hashing the secret value to output a hashed secret value;
signing, with a private key, the hashed configuration value to output a hashed and signed configuration value;
signing, with the private key, the hashed secret value to output a hashed and signed secret value;
storing the configuration value, the secret value, the hashed and signed configuration value, and the hashed and signed secret value in a release file, wherein the configuration value and the secret value are environment variables; and
executing the application using the release file.

9. The computer program product of claim 8, wherein the configuration file stores a plurality of links, and wherein the program code is executable by the at least one processor to perform operations for:
determining that a link of the plurality of links includes a macro; and
executing the macro to modify the secret value retrieved using the link.

10. The computer program product of claim 8, wherein the configuration file stores a plurality of links, wherein a first link of the plurality of links comprises a reference to a second link of the plurality of links in the second repository, and wherein the second link is used to retrieve the secret value in a third repository.

11. The computer program product of claim 8, wherein the application:
decrypts, with a public key, the hashed and signed configuration value to obtain a decrypted and hashed configuration value and the hashed and signed secret value to obtain a decrypted and hashed secret value;
compares the hashed configuration value with the decrypted and hashed configuration value to determine whether the configuration value is valid; and
compares the hashed secret value with the decrypted and hashed secret value to determine whether the secret value is valid.

12. The computer program product of claim 8, wherein the program code is executable by the at least one processor to perform operations for:
accessing the second repository using a token with read-only permission.

13. The computer program product of claim 8, wherein the program code is executable by the at least one processor to perform operations for:
invoking a release command with parameters for a location of the configuration file and a location of the release file.

14. The computer program product of claim 8, wherein a Software as a Service (SaaS) is configured to perform the operations of the computer program product.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
retrieving a configuration file for an application from a first repository, wherein the configuration file stores a configuration value and a link to a secret value in a second repository;
retrieving the secret value from the second repository using the link to the secret value in the configuration file;
hashing the configuration value to output a hashed configuration value;
hashing the secret value to output a hashed secret value;
signing, with a private key, the hashed configuration value to output a hashed and signed configuration value;
signing, with the private key, the hashed secret value to output a hashed and signed secret value;
storing the configuration value, the secret value, the hashed and signed configuration value, and the hashed and signed secret value in a release file, wherein the configuration value and the secret value are environment variables; and
executing the application using the release file.

16. The computer system of claim 15, wherein the configuration file stores a plurality of links, and wherein the operations further comprise:
determining that a link of the plurality of links includes a macro; and
executing the macro to modify the secret value retrieved using the link.

17. The computer system of claim 15, wherein the configuration file stores a plurality of links, wherein a first link of the plurality of links comprises a reference to a second link of the plurality of links in the second repository, and wherein the second link is used to retrieve the secret value in a third repository.

18. The computer system of claim 15, wherein the application:
decrypts, with a public key, the hashed and signed configuration value to obtain a decrypted and hashed configuration value and the hashed and signed secret value to obtain a decrypted and hashed secret value;
compares the hashed configuration value with the decrypted and hashed configuration value to determine whether the configuration value is valid; and
compares the hashed secret value with the decrypted and hashed secret value to determine whether the secret value is valid.

19. The computer system of claim 15, wherein the operations further comprise:
accessing the second repository using a token with read-only permission.

20. The computer system of claim 15, wherein a Software as a Service (SaaS) is configured to perform the operations of the computer system.

* * * * *